(12) United States Patent
Suzuki

(10) Patent No.: US 7,053,933 B2
(45) Date of Patent: May 30, 2006

(54) IMAGE PICKUP APPARATUS HAVING AN AUTOMATIC MODE CONTROL

(75) Inventor: Toshihiko Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1123 days.

(21) Appl. No.: 09/825,022

(22) Filed: Apr. 3, 2001

(65) Prior Publication Data

US 2001/0052937 A1 Dec. 20, 2001

(30) Foreign Application Priority Data

Apr. 4, 2000 (JP) .................................. 2000-102035

(51) Int. Cl.
*H04N 5/232* (2006.01)

(52) U.S. Cl. .................. 348/211.6; 348/231.2

(58) Field of Classification Search ............ 348/207.99, 348/231.2, 211.6, 220.1, 208.12, 231.99, 348/231.6, 231.5, 207.11, 239, 333.02; 715/709, 715/704; 396/246; 386/121

See application file for complete search history.

(56) References Cited

U.S. PATENT DOCUMENTS

| | | | | | |
|---|---|---|---|---|---|
| 5,664,243 | A | * | 9/1997 | Okada et al. | 396/246 |
| 5,905,528 | A | * | 5/1999 | Kodama | 348/220.1 |
| 5,982,984 | A | * | 11/1999 | Inuiya | 386/121 |
| 6,222,538 | B1 | * | 4/2001 | Anderson | 715/709 |
| 6,798,447 | B1 | * | 9/2004 | Katsuki | 348/208.12 |

* cited by examiner

*Primary Examiner*—Tuan Ho
*Assistant Examiner*—Brian Jelinek
(74) *Attorney, Agent, or Firm*—Morgan & Finnegan, L.L.P.

(57) ABSTRACT

An object of this invention is to easily execute photography in various photography modes. In order to achieve this object, an image pickup apparatus of this invention has a setting device for setting a plurality of chapters, and a control device for controlling photography operation in an order of the set chapters on the basis of settings of the plurality of chapters by the setting device, in which the setting device sets, for each of the plurality of chapters, a photography time and a mode for executing desired photography during the photography time.

13 Claims, 14 Drawing Sheets

PROGRAM 1 (ATHLETIC MEETING)

| chapter | TIME(min) | PHOTOGRAPHY MODE | FRAME DISPLAY | SPECIAL EFFECT |
|---|---|---|---|---|
| | | | 'ATHLETIC MEETING' FADE-IN | FADE-IN |
| 1 | 3 | Auto | 'ENTRY MARCH' | |
| 2 | 10 | SCENE | 'TUG OF WAR' OVERLAP | |
| | | | | OVERLAP |
| 3 | 10 | PORTRAIT | OVERLAP 'DANCE' | |
| | | | | OVERLAP |
| 4 | 7:30 | SPORTS | OVERLAP 'RELAY' | |
| ⋮ | ⋮ | ⋮ | ⋮ | ⋮ |
| n | 3 | Auto | 'LEAVING' FADE-OUT | |
| | | | | FADE-OUT |
| TOTAL | 50 | | | |

Column headers: 201, 202, 203, 204, 205

FIG. 2

PROGRAM 1 (ATHLETIC MEETING)

| chapter | TIME(min) | PHOTOGRAPHY MODE | FRAME DISPLAY | SPECIAL EFFECT |
|---|---|---|---|---|
| | | | 'ATHLETIC MEETING' FADE-IN | FADE-IN |
| 1 | 3 | Auto | 'ENTRY MARCH' | |
| 2 | 10 | SCENE | 'TUG OF WAR' OVERLAP | |
| | | | | OVERLAP |
| 3 | 10 | PORTRAIT | OVERLAP 'DANCE' | |
| | | | | OVERLAP |
| 4 | 7:30 | SPORTS | OVERLAP 'RELAY' | |
| | | | | |
| ⋮ | ⋮ | ⋮ | ⋮ | ⋮ |
| n | 3 | Auto | 'LEAVING' FADE-OUT | |
| | | | | FADE-OUT |
| TOTAL | 50 | | | |

FIG. 10

PROGRAM 2 (ATHLETIC MEETING)

| chapter | TIME(min) | PHOTOGRAPHY MODE | FRAME DISPLAY | RECORDING MODE |
|---|---|---|---|---|
| | | | 'ATHLETIC MEETING' | |
| 1 | 10 | INTERLACED | 'ENTRY MARCH' | LP |
| 2 | 20 | INTERLACED | 'TUG OF WAR' | LP |
| 3 | 10 | NON-INTERLACED | 'DUMPLING' RACE | SP |
| 4 | 7:30 | NON-INTERLACED | 'RELAY' | SP |
| ⋮ | ⋮ | ⋮ | ⋮ | ⋮ |
| n | 10 | INTERLACED | 'LEAVING' | LP |
| TOTAL | 80 | | | |

FIG. 12

| chapter | SET TIME(min) | ACTUAL PHOTOGRAPHY TIME (min) | SET CORRECTION TIME (min) |
|---|---|---|---|
| ⋮ | ⋮ | ⋮ | ⋮ |
| 2 | 10 | 12.5 | — |
| 3 | 10 | — | −1 |
| 4 | 10 | — | −1 |
| 5 | 5 | — | −0.5 |

IMAGE PICKUP APPARATUS HAVING AN AUTOMATIC MODE CONTROL

FIELD OF THE INVENTION

The present invention relates to photography in various photography modes in an image pickup apparatus such as a video camera.

DESCRIPTION OF THE RELATED ART

In recent years, as the digital video technology for a video camera and the like is making remarkable progress to automate various performances and improve the operability, more user-friendly image pickup apparatuses with advanced functions have been proposed.

For example, an automatic exposure compensation function is a very important factor that determines the image quality, and satisfactory exposure compensation is always required independently of the photography condition, i.e., under any photography environment or situation.

A system has been conventionally proposed to meet this requirement, in which control contents for automatic exposure compensation are individually set as programs assuming several representative photography situations and selectively switched by the user.

Automatic exposure compensation modes are set in advance assuming the representative photography situations and arbitrarily selected by the user.

As long as an instantaneous still image is to be photographed, the user can appropriately select the representative automatic exposure compensation mode, as described above.

However, when a moving image is to be photographed for a long time by, e.g., a video camera, the situation often rapidly changes for each scene (to be referred to as a chapter hereinafter). It is very cumbersome for the user to selectively switch the photography mode in accordance with the change in situation.

That is, in photographing an image with a video camera or the like, the user's greatest care is given to composition setting according to a dynamic change in object of interest. Forcing the user to do appropriate operation control in accordance with a change in photography situation is not friendly even in terms of convenience.

In fact, many home video camera users normally fix the photography mode to the automatic mode and do not change the mode at all because of the difficulty in mode switching. In addition, functions for edit after photography are rarely used because of time load and a few use opportunities. The helpful advanced functions of the image pickup apparatus are not effectively used and left unused.

SUMMARY OF THE INVENTION

The present invention has been made in consideration of the above situation, and has as its object to easily execute photography in various photography modes.

In order to achieve the above object, according to an aspect of the present invention, there is provided an image pickup apparatus comprising: setting means for setting a plurality of chapters; and control means for controlling photography operation in an order of the set chapters on the basis of settings of the plurality of chapters by said setting means, wherein the setting means sets, for each of the plurality of chapters, a photography time and a mode for executing desired photography during the photography time.

According to another aspect, there is provided an image pickup method comprising the steps of: setting a photography time and a mode for executing desired photography during the photography time for each of a plurality of chapters; and controlling photography operation in an order of the set chapters on the basis of settings of the plurality of chapters.

According to still another aspect, there is provided an operation processing program for an image pickup apparatus, comprising operation processing steps of: setting a photography time and a mode for executing desired photography during the photography time for each of a plurality of chapters; and controlling photography operation in an order of the set chapters on the basis of settings of the plurality of chapters.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a view showing setting examples of a photography program of the embodiment;

FIG. 10 is a view showing additional setting examples of the photography program of the embodiment;

FIG. 12 is a view for explaining the photography operation according to the embodiment;

DETAILED DESCRIPTION OF THE PREFERRED EMBODIMENTS

An embodiment of the present invention will be described below with reference to the accompanying drawings.

Figure 1:
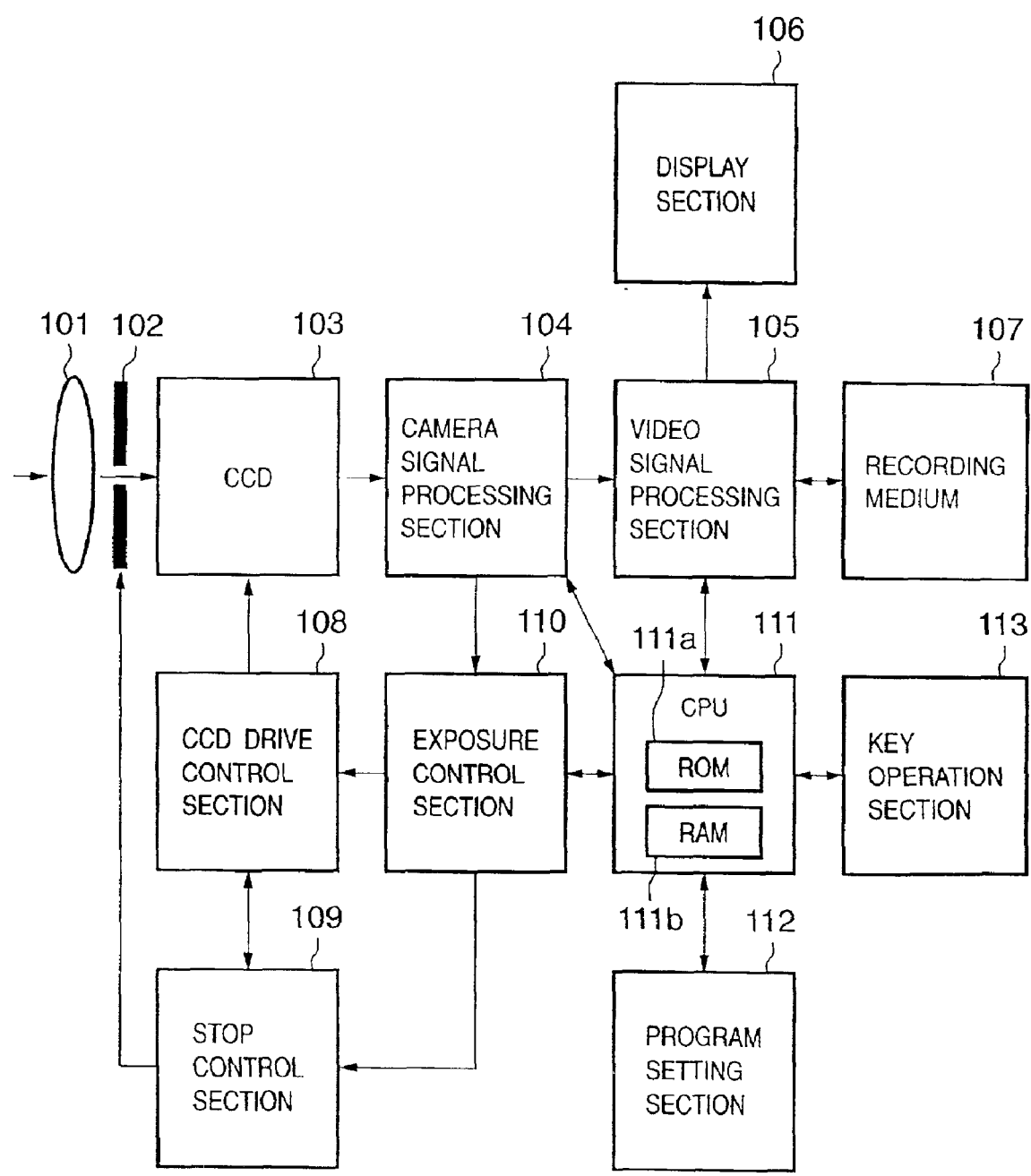
FIG. 1 is a block diagram showing the schematic arrangement of an image pickup apparatus according to the embodiment.

FIG. 1 is a block diagram showing the schematic arrangement of an image pickup apparatus to which the present invention is applied. Referring to FIG. 1, reference numeral 101 denotes a lens unit; 102, a stop; 103, a CCD (Charge Coupled Device); 104, a camera signal processing section; 105, a video signal processing section; 106, a display section; 107, a recording medium; 108, a CCD drive control section; 109, a stop control section; 110, an exposure control section; 111, a CPU; 112, a program setting section; and 113, a key operation section.

The CPU 111 shown in FIG. 1 not only functions as a so-called central processing unit but also includes a ROM 111a and RAM 111b. In the ROM 111a, a program for controlling photography program setting processing unique to the present invention and a program corresponding to the flow chart shown in FIG. 10 (both will be described later), which are executed by the program setting section 112, are preset in addition to various programs necessary for general photography processing. The CPU 111 executes various photography processing operations on the basis of the programs preset in the ROM 111a. At this time, the CPU 111 uses the RAM 111b as a work area.

Operation of the image pickup apparatus will be described next. A series of focus control and zoom control are executed for an object through the lens unit 101, and the incident light amount is adjusted by the stop 102. An optical image input through the lens unit 101 and having a light amount adjusted by the stop 102 is formed on the image pickup surface of the CCD 103. The CCD 103 photoelectrically converts the optical image and outputs it to the camera signal processing section 104 as an electronic video (image) signal. The camera signal processing section 104 digitizes the video signal and executes predetermined camera signal processing such as gain adjustment, gamma correction, and white balance adjustment.

At this time, the exposure control section 110 controls the stop control section 109 and CCD drive control section 108 under the control of the CPU 111 such that optimum exposure is performed. More specifically, the stop control section 109 controls the aperture value of the lens unit 101 by controlling a motor (not shown) for driving the stop 102, and the CCD drive control section 108 sets a desired shutter speed (so-called electronic shutter) by controlling accumulation operation, read operation, and reset operation of the CCD 103, thereby obtaining appropriate exposure.

To obtain appropriate exposure, the CPU 111 receives a luminance video signal output from the camera signal processing section 104 and controls the stop control section 109 such that the integration level of the luminance video signal falls within a predetermined range. The CPU 111 also controls the exposure time, i.e., shutter speed by switching the drive pulse to be output to the CCD drive control section 108 and thus changing the accumulation time of the CCD 103.

On the other hand, to record or play back the video signal output from the camera signal processing section 104 on or from the recording medium 107, the video signal processing section 105 performs predetermined video signal processing. The video signal output from the camera signal processing section 104 or a playback video signal read out from the recording medium 107 is displayed on the display section 106 together with characters (characters and pictures).

The program setting section 112 sets various photography programs under the control of the CPU 111. The CPU 111 causes the display section 106 to display a menu selection window (dialog box) for setting various photography programs such that a photography program can be selected by selecting a menu through the key operation section 113. That is, the display section 106 constitutes part of a user interface. Although a photography program is normally set in advance before photography, a temporarily set photography program may be changed.

FIG. 2 is a view showing setting examples of the photography program. In this setting program, "athletic meeting" is programmed as part of growth record of a child. The setting procedure in this embodiment is as follows.

(1) Scenes to be photographed are divisionally set in advance in units of numbers of chapters 201.

(2) A photography mode 203 (scenic mode, sports mode, or portrait mode) is selected for each chapter number.

(3) A comment of frame display 204 is input for each chapter number.

(4) A special effect 205 for connection between the chapters is selected.

(5) A target photography time 202 is individually set for each chapter number.

Figure 3:
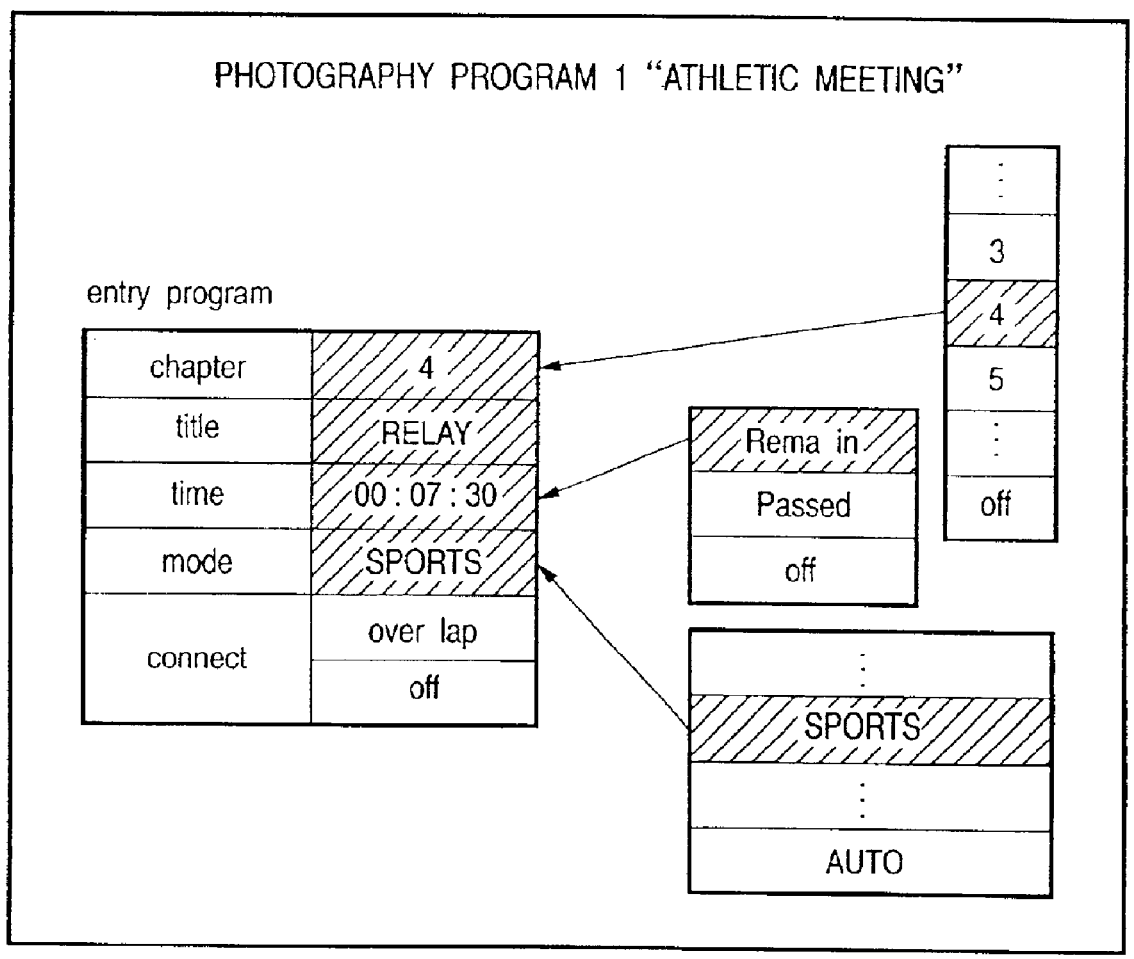
FIG. 3 is a view showing a user interface (setup window) of the embodiment.

FIG. 3 is a view showing a user interface used to create a photography program. In this user interface, a program is set by a menu form using the display section 106 and key operation section 113. Parameters of "entry program" are selectively set.

In this case, for a scene section, chapter "4", "title" is set to "relay", "time" as the target photography set time of this scene is set to "Remain (remaining time)", photography program "mode" (photography mode) is set to "SPORTS", and special effect "connect" for connection photography between chapters is set to "overlap" from a preceding chapter 3. For a next chapter 5, special effect "off" is selected.

The above "mode" and "connect" will be described next.

Figure 4:
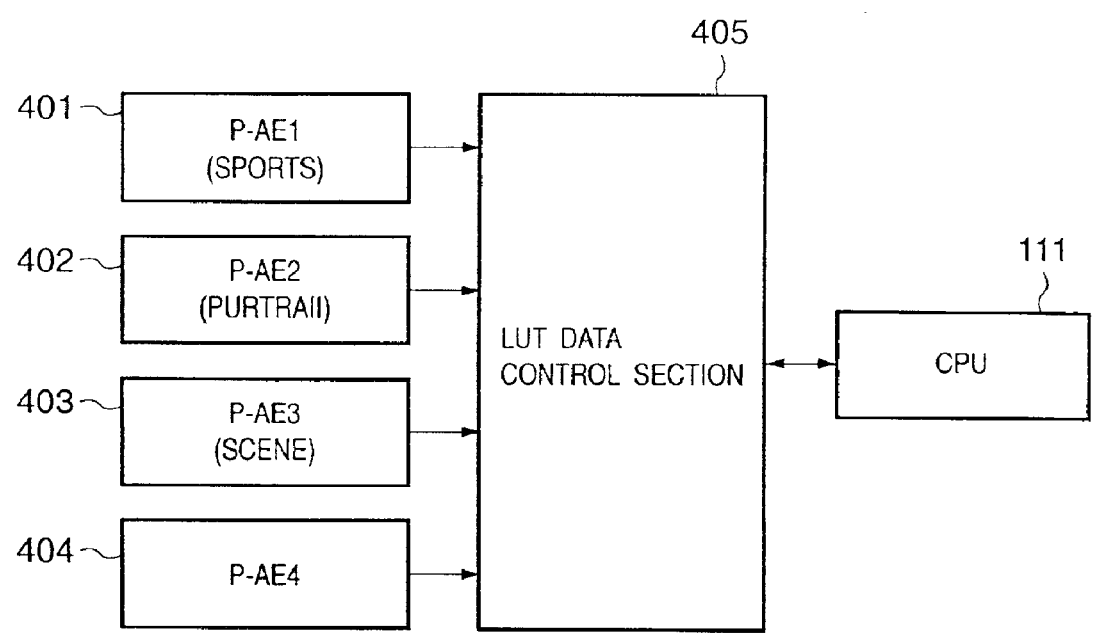
FIG. 4 is a block diagram showing the arrangement of the exposure setting system of the photography program of the embodiment.

"Mode" setting will be described with reference to FIG. 4. FIG. 4 is a block diagram showing the arrangement of the "mode" setting system. Referring to FIG. 4, in lookup tables 401 to 404, exposure control parameters for the photography modes are registered. An LUT data control section 405 looks up one of the lookup tables 401 to 404, which corresponds to the set photography mode and supplies, to the CPU 111, exposure control parameters optimum to the set photography mode.

The exposure control parameters include the stop, shutter speed, and gain. The parameters are registered in the lookup tables 401 to 404 in advance assuming typical photography scenes.

The typical photography modes are as follows.

(1) Landscape Mode

Generally, when scenic is to be photographed, both the ground and sky are often simultaneously composed into a frame. The luminance of the sky is higher than that of the ground, and a person or the like in front of the low-luminance ground or sky becomes excessively dark due to underexposure.

To prevent this, photometry is performed with priority on the lower side corresponding to the ground. In addition, since there are a few objects that rapidly move, the shutter speed is set low (e.g., about 1/60 sec), and exposure is controlled mainly by the aperture.

(2) Sports Mode

An object that rapidly moves should be clearly photographed while suppressing blur. To do this, the shutter speed is set high (e.g., about 1/500 sec). For a change in object luminance, exposure control is performed by changing the aperture and gain.

(3) Portrait Mode

A person should be emphasized with the blurred background. For this purpose, photometry is mainly performed for the central portion of the frame, and the depth of field is set shallow. That is, the aperture is set almost in the full-aperture state, and the shutter speed is set high.

For example, in the lookup table 401, parameters for increasing the shutter speed (high speed) that controls the charge accumulation time of the CCD 103 are registered as P-AE1 assuming an object that rapidly moves such that photography in the "SPORTS" mode excellent in moving resolution can be performed.

In the lookup table 402, as parameters P-AE2, a parameter for setting the stop 102 in the full-aperture state is preferentially registered, and the remaining parameters such as the shutter speed and gain are registered such that exposure control is performed with these parameters, thereby allowing "PORTRAIT" photography to make the field of depth shallow and the background blur.

In the lookup table 403, parameters for mainly performing photometry on the lower side of the frame, reducing the shutter speed (low speed), and executing exposure compensation mainly using the stop 102 are registered as parameters P-AE3, thereby allowing "scenic" photography.

Figure 5:
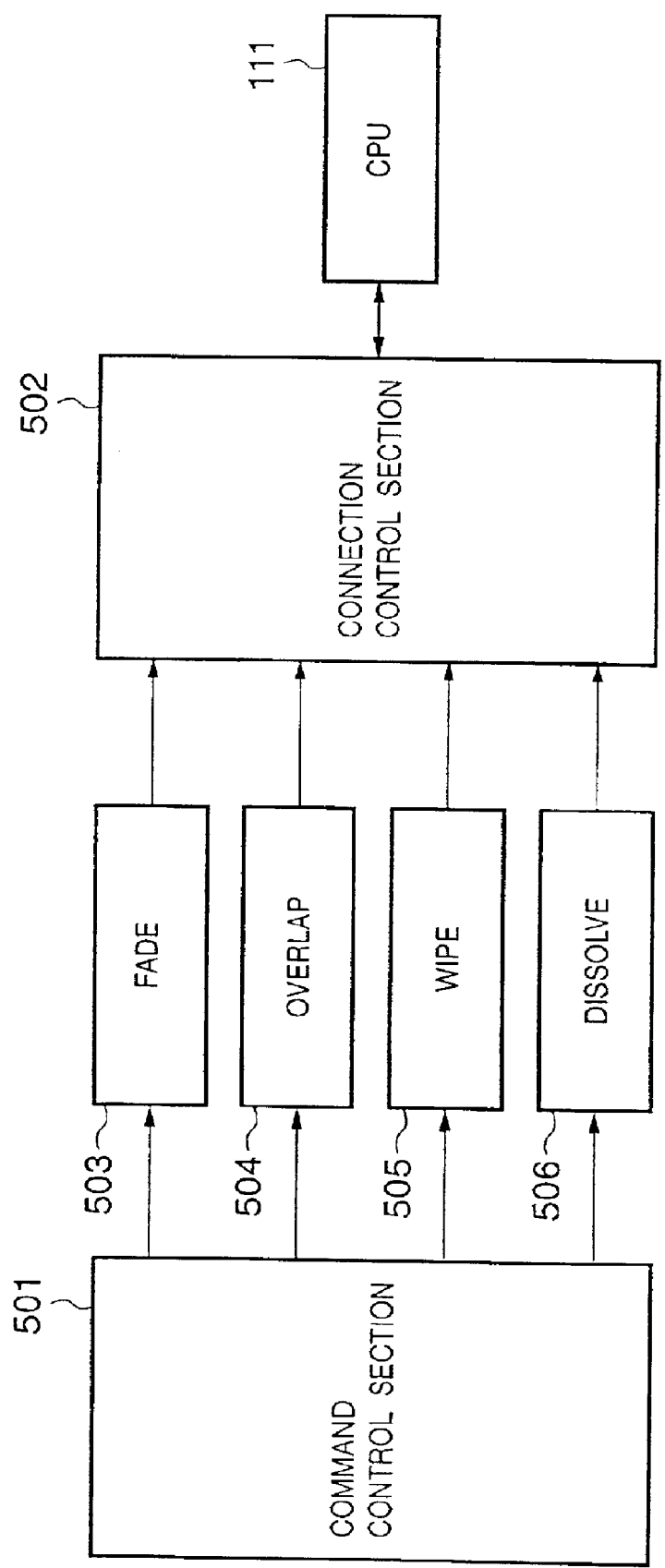
FIG. 5 is a block diagram showing the setting system for a special effect for connection to the photography program of the embodiment.

"Connect" setting will be described next with reference to FIG. 5. FIG. 5 is a functional block diagram of the "connect" setting system. Reference numerals 503 to 506 denote individual operation modes (commands) of the special effect for connection.

As control commands related to connection processing for scene change between a certain chapter and the next chapter, the fade command 503, overlap command 504, wipe command 505, and dissolve command 506 are in entry. These special effect commands for connection control are selected by a command control section 501 on the basis of the set contents of the "connect" item by the program setting section 112 and supplied to a connection control section 502. The connection control section 502 executes connection processing in response to a connection operation timing signal supplied from the CPU 111.

"Fade" is a special effect that gradually makes an image played back later clear (fade-in) or gradually makes an image played back previously unclear (fade-out). "Overlap" is a special effect that synthesizes a plurality of images. "Wipe" is a special effect that erases an image from one or a plurality of directions. "Dissolve" is a special effect that gradually changes an image content to another image content.

Figure 6:
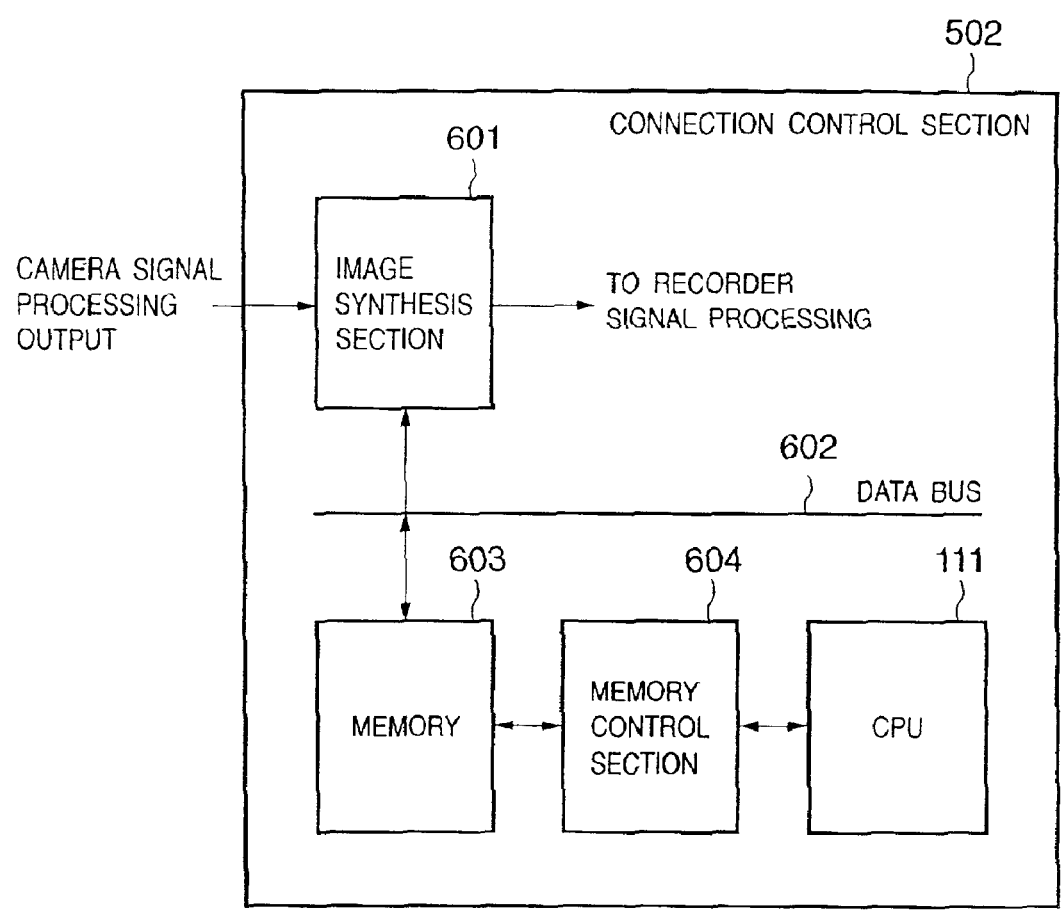
FIG. 6 is a block diagram showing the arrangement of the connection control section of the embodiment.

The connection control section 502 has an arrangement shown in FIG. 6. The arrangement shown in FIG. 6 mainly implements the overlap effect. To obtain another special effect such as "fade", "wipe", or "dissolve", a known effector for implementing the special effect is prepared.

Referring to FIG. 6, reference numeral 601 denotes an image synthesis section; 602, a data bus; 603, a memory; and 604, a memory control section 604. The memory 603 holds the image data of the final frame or several final frames of the preceding chapter.

For, e.g., overlap processing, when a connection operation timing signal is output from the CPU 111, the memory control section 604 reads out the image data of the final frame or several final frames of the preceding chapter from the memory 603 and supplies the image data to the image synthesis section 601.

The image synthesis section 601 synthesizes the image data of the first frame or several first frames of the next chapter, which are output from the camera signal processing section 104, with the image data of the final frame or several final frames of the preceding chapter, which are read out from the memory 603, and outputs the synthesized data to the recording medium 107 as a recorder signal.

Figure 7:
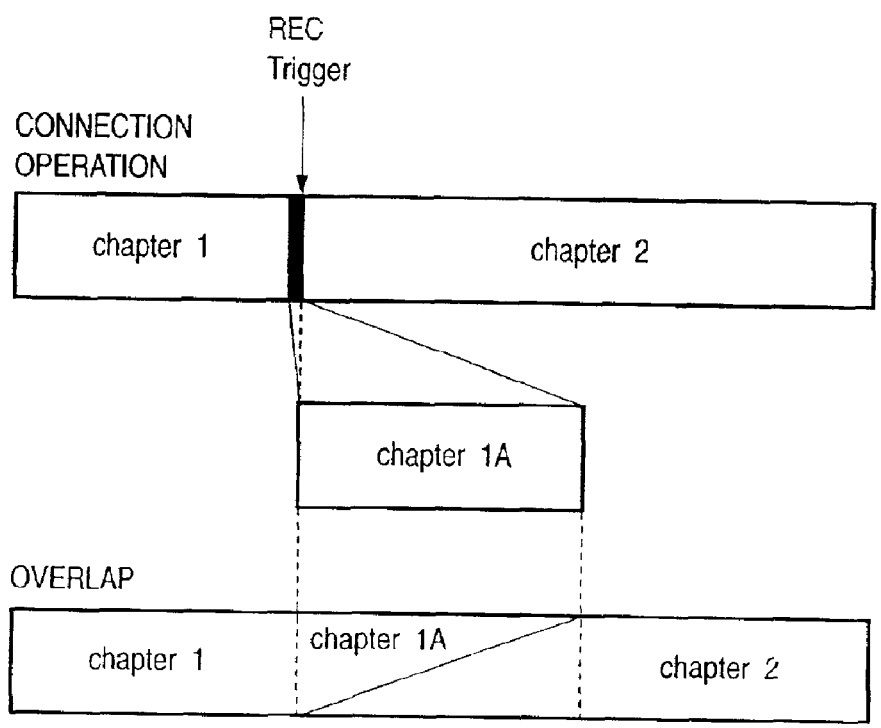
FIG. 7 is an operation explanatory view of the special effect such as overlap in the embodiment.

That is, for overlap processing, as shown in FIG. 7, a chapter 1A as the final frame image of a chapter 1 is held in the memory 603. When a recording trigger signal (REC trigger) for a subsequent chapter 2 is output from the CPU 111, the image of the chapter 1A and the first frame image of the next chapter 2 are synthesized as shown in FIG. 7, thereby obtaining the overlap effect.

Figure 8:
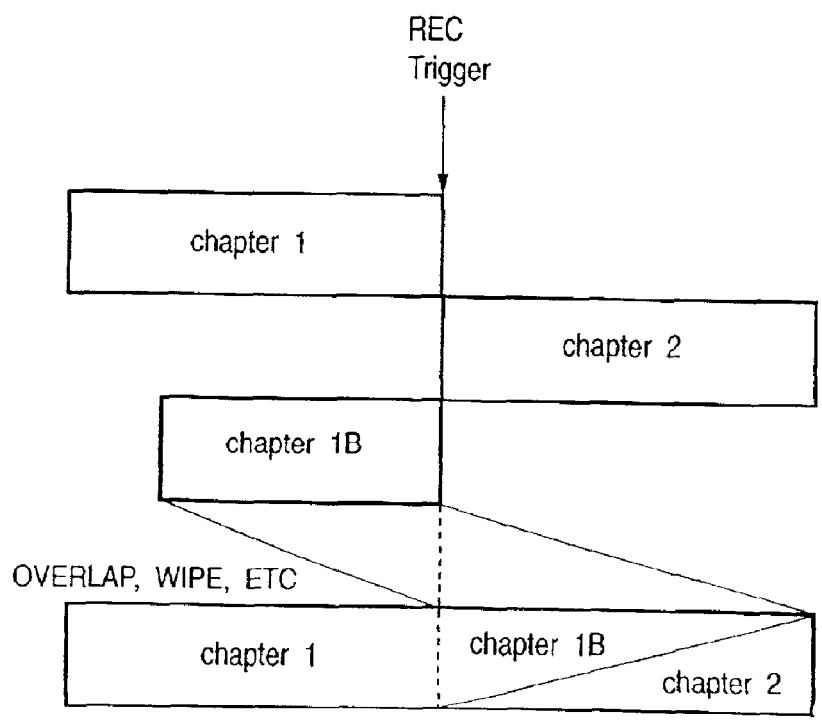
FIG. 8 is another operation explanatory view of the special effect such as overlap in the embodiment.

Alternatively, as shown in FIG. 8, the image data of a plurality of final frames of the chapter 1 may be held in the memory 603 as a chapter 1B and synthesized with the image data of a plurality of first frames of the chapter 2 to obtain the overlap effect in the moving image.

Photography processing based on a set photography program will be described next with reference to the flow chart shown in FIG. 9.

At the start of photography, it is determined whether photography processing based on a photography program set by the user in advance is instructed by the key operation section 113 (step S1). If NO in step S1, normal photography based on no photography program is executed (step S2), and the processing is ended.

If YES in step S1, the photography program set by the program setting section 112 and selected by the key operation section 113 is read out from a memory (not shown) in the program setting section 112 and loaded to the RAM 111b (step S3). If only one photography program is stored in the memory in the program setting section 112, the photography program is automatically loaded to the RAM 111b without being selected by the key operation section 113.

It is determined next whether a chapter number is selected by the key operation section 113 to change settings of the photography program loaded to the RAM 111b or check the contents of the photography program (step S4). If YES in step S4, setting parameters such as the time 202, photography mode 203, frame display content 204, and connection special effect 205 corresponding to the chapter number are displayed on the display section 106 to support the change/check operation. If the change operation is performed, the setting parameters are changed in accordance with the change operation (step S5), and the flow advances to step S6. If NO in step S4, the flow skips step S5 and advances to step S6.

In step S6, a recording start instruction from the key operation section 113 is waited. When a recording start instruction is input, photography processing is begun on the basis of the photography parameters for the first chapter. Simultaneously, the time (remaining time) of the photography parameters is set to a timer (not shown), and countdown is started (step S7).

The chapter executed in step S7 is a chapter having a number next to the chapter photographed in the preceding processing loop. In the first loop, the chapter with the current number is executed. This means that parameter change in steps S4 and S5 is executed immediately before the chapter for which the parameters are to be changed is photographed. This also means that if a chapter number is selected, photography is automatically performed in the photography mode for the next chapter number.

It is determined next whether the timer value is "0" (step S8). If NO in step S8, the flow returns to step S7 to continue the photography processing until the timer value becomes "0". If YES in step S8, it is determined whether stop of the program photography mode is instructed by the key operation section 113 (step S9). If NO in step S9, the flow returns to step S4 to continue photography in the program photography mode. If YES in step S9, the processing is ended.

As can be understood from the above description, in this embodiment, settings of the photography program can be changed in a time zone before photography of the first chapter immediately after the program photography mode starts and during the photography interval period between the chapter photography operations.

FIG. 10 is a view showing setting examples of the photography program in addition to the setting examples of the photography program shown in FIG. 2.

In this embodiment, as another photography mode, normal interlaced photography or non-interlaced photography is selectively set. In the interlaced photography mode, two field images of one frame are sequentially loaded from the CCD 103. Non-interlaced photography is also called progressive photography in which images (two field images) of one frame are simultaneously loaded from the CCD 103 and divisionally transmitted as two field images. With this photography mode, a frame image (still image) of a moving object or a picture with a large field correlation in, e.g., panning the camera can be clearly expressed.

In this embodiment, as shown in FIG. 10, SP or LP can be selected as a photography recording time mode for the recording medium 107. With this mode, standard recording time or long recording time is selected. The recording time is changed by changing the recording compression ratio of a photographed image or setting more fine recording tracks.

As described above, in this embodiment, program setting can be done for each chapter by switching the photography mode between the interlaced mode and the non-interlaced mode and switching the recording mode between SP and LP. In this case as well, the settings are done through a user interface, as in the first embodiment.

Figure 11:
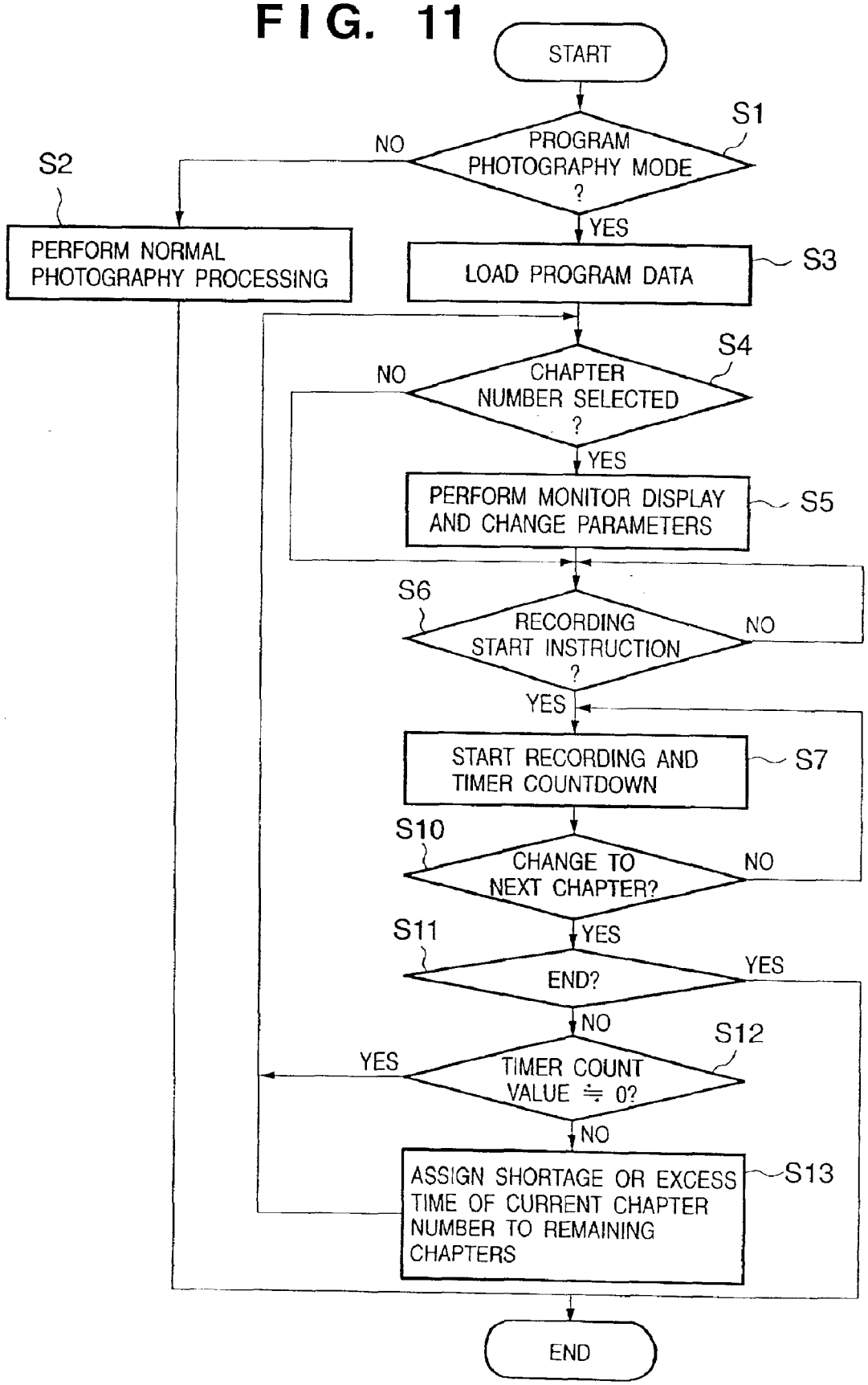
FIG. 11 is a flow chart showing another photography operation according to the embodiment.

FIG. 11 is a flow chart showing another form of the photography processing flow chart in the image pickup apparatus according to this embodiment.

Figure 9:
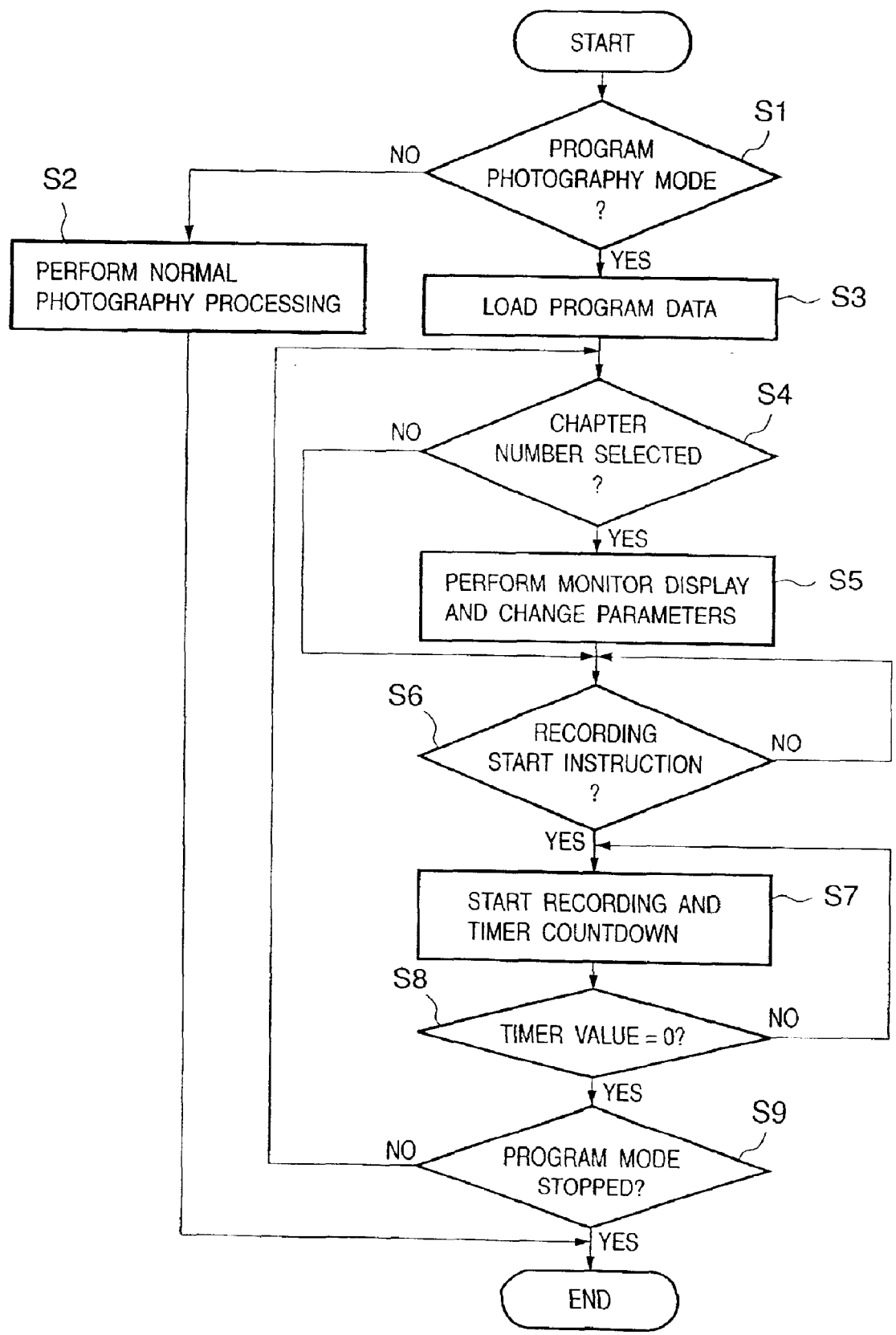
FIG. 9 is a flow chart showing photography operation according to the embodiment.

In the photography processing shown in FIG. 9, when the timer count value becomes 0, the processing shifts to the next chapter. The photography processing shown in FIG. 11 is different from that in FIG. 9 in that even when the timer count value is not 0, the photography time for the chapter that is being photographed can be prolonged (or shortened). Processing in steps S1 to S7 of FIG. 11 is the same as in FIG. 9, and a description thereof will be omitted. For each chapter, the photography/recording time 202, photography mode 203, connection special effect 205, interlaced or non-interlaced mode 203a, and recording mode 206 can be set, as shown in FIGS. 2 and 10.

In step S6, the user operates the key operation section 113 to instruct to start recording. The flow advances to step S7 to start photography processing on the basis of photography parameters for the first chapter. Simultaneously, countdown of the preset remaining photography time of the first chapter is started. The remaining photography time of the chapter is displayed on the display section 106 while being superposed on the photographed image, thereby causing the user to grasp the progress situation of the program photography mode.

In step S10, it is determined whether the user operates the key operation section 113 to end photography of the current chapter and input an instruction for a change to the next chapter. If NO in step S10, the flow returns to step S7 to continue counting by the timer.

In step S11, it is determined whether the next chapter is set in advance. If NO in step S11, it is determined that photography/recording of all chapters is ended, and the program photography mode is ended. If YES in step S11, the flow advances to step S12.

In step S12, the timer count value for the chapter that is ended in step S10 is checked, and it is checked whether the timer count value is almost 0. If YES in step S12, the flow returns to step S4 to prepare for the next chapter. If NO in step S12, i.e., when the actual photography time is shorter or longer than the set time of the chapter that is ended in step S10, the flow advances to step S13.

Processing in step S13 will be described. Assume a case wherein the timer count value exceeds 0, the time becomes longer the preset time of the chapter. FIG. 12 is a view for explaining processing in step S13 in detail. Processing in step S13 will be described with reference to FIG. 12.

For example, in FIG. 12, assume that when photography/recording is ended up to the chapter 2, the photography time of the chapter 2 immediately after the end of photography/recording is 12.5 (min) that is longer than the set time by 2.5 min. If program photography is executed in this state, the photography time of the final chapter 5 is 2.5 min, so photography actually intended for the chapter 5 is impossible. To prevent this, in the processing in step S13, the excess time of the chapter 2 is subtracted from the times of the chapters 3 to 5 that have not been photographed yet in accordance with the preset photography/recording time ratio.

Referring to FIG. 12, the set times of the chapters 3, 4, and 5 are 10 min, 10 min, and 5 min, respectively, and the set time ratio is 2:2:1. Hence, set correction times for the set times of the chapters 3, 4, and 5 are −1 min, −1 min, and −0.5 min, respectively. As a result, the set times of the chapters 3, 4, and 5 after the chapter 2 are changed to 9 min, 9 min, and 4.5 min. When the processing in step S13 is ended, the flow returns to step S4.

In this way, even when the photography/recording time of a certain chapter is prolonged, appropriate program photography can be performed.

In the detailed example shown in FIG. 12, a case wherein the actual photography time of the chapter 2 becomes longer than the set photography time has been described. When the actual photography time is shorter than the set photography time, the remaining time of the chapter 2 is added to the chapters 3 to 5 in accordance with the preset photography/recording time ratio. For example, if the actual photography/recording time of the chapter 2 is 7.5 min, the remaining time is 2.5 min, so the set correction times for the set times of the chapters 3, 4, and 5 are +1 min, +1 min, and +0.5 min, respectively.

An embodiment in which a detachable magnetooptical disk having a large storage capacity is used as a recording medium of a recording section 107 of the image pickup apparatus shown in FIG. 1 will be described. A magnetooptical disk is a rewritable recording medium using both the magnetic storage scheme and the optical technology. Unlike a recording medium such as a magnetic tape, the magnetooptical disk can be read- and write-accessed at a high speed, and also random-accessed in playing back a photographed image.

Figure 13:
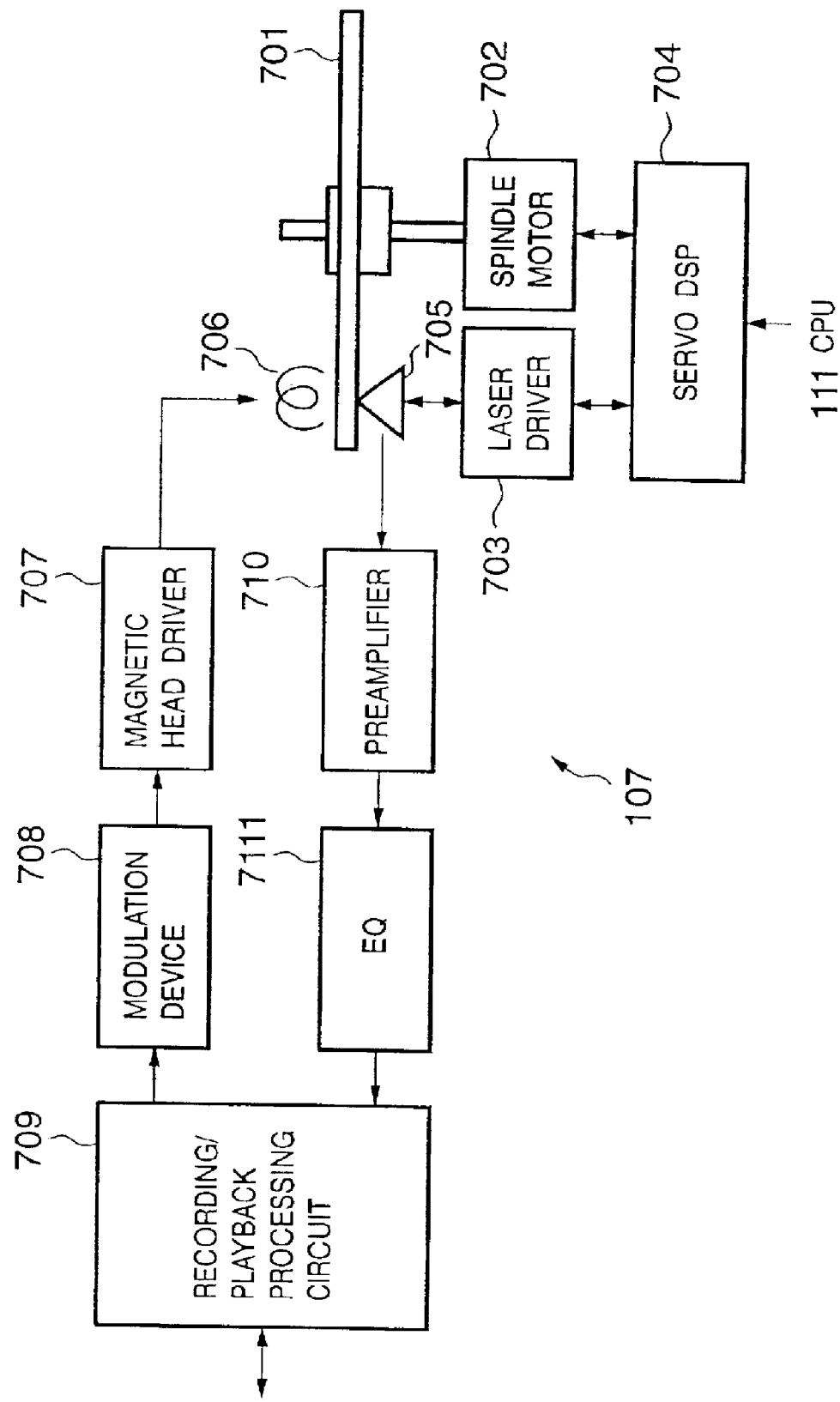
FIG. 13 is a block diagram showing the arrangement of a recording section 107 when a magnetooptical disk is used as a recording medium.
Figure 14:
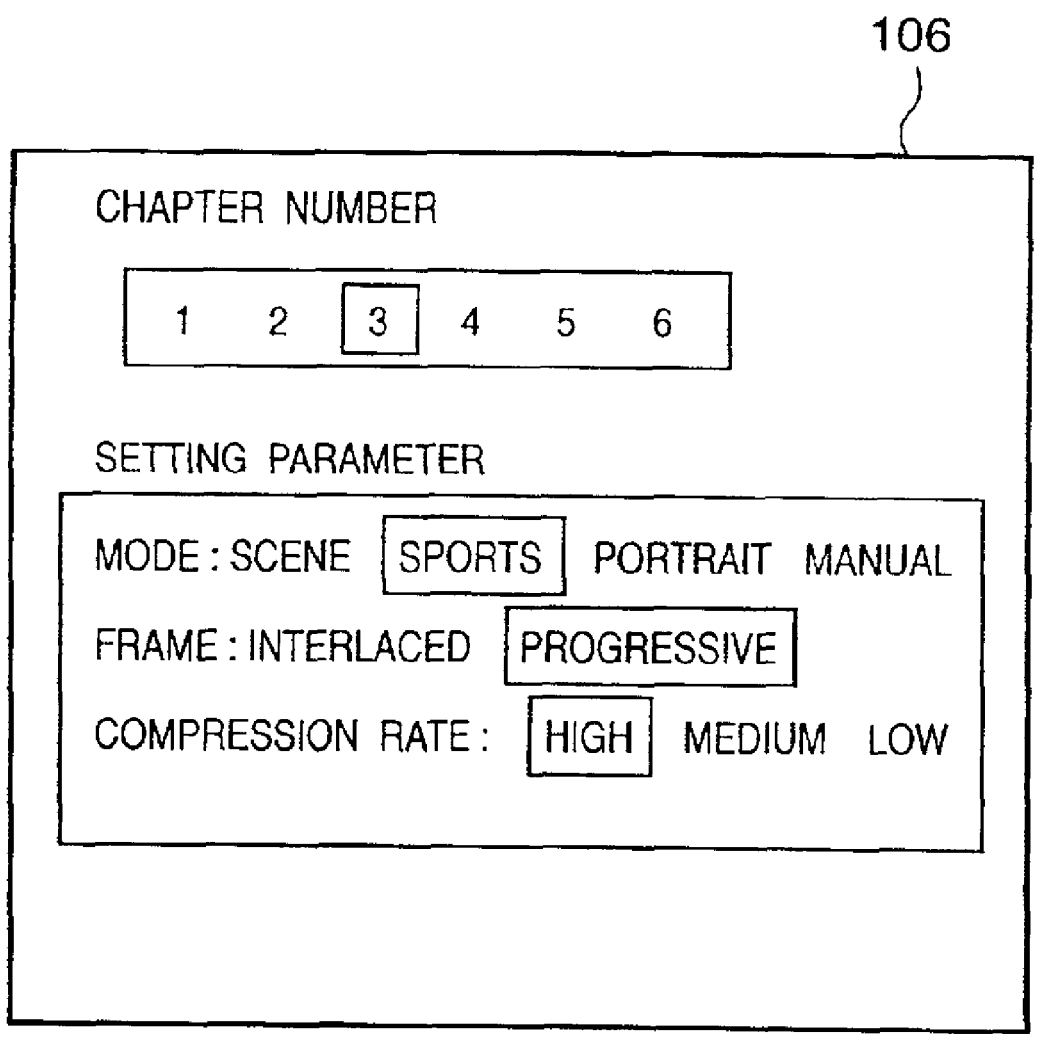
FIG. 14 is a view showing a display example of a display section 106 in changing chapter settings.

FIG. 13 is a block diagram showing the arrangement of the recording section 107 when a magnetooptical disk is used as a recording medium.

Referring to FIG. 13, the recording section 107 is constructed by a magnetooptical disk 701, spindle motor 702, laser driver 703, servo DSP (Digital Signal Processor) 704, optical pickup 705, magnetic head 706, magnetic head driver 707, modulation device 708, recording/playback processing circuit 709, preamplifier 710, and equalizer 711.

The servo DSP 704 controls the spindle motor 702 to apply predetermined rotation servo to the magnetooptical disk 701 and controls a traverse motor (not shown) to trace the magnetooptical disk 701 to a predetermined track. The servo DSP 704 also controls the actuator of the optical pickup 705 to adjust focus and tracking of a laser beam.

To play back image data recorded on the magnetooptical disk 701, the magnetooptical disk 701 is irradiated with a laser beam having predetermined power by the laser driver 703. When the amount of light reflected by the magnetooptical disk 701 is detected, the image data is played back as an electrical signal. The electrical signal is amplified to a predetermined level by the preamplifier 710. The equalizer 711 suppresses the high-frequency components of the amplified electrical signal to remove noise and executes equalizing processing such as boosting for the specific band. The equalized electrical signal is converted into an image signal by the recording/playback processing circuit 709 through signal processing such as data detection, demodulation, and error correction.

To record image data on the magnetooptical disk 701, an image signal converted into a predetermined format by the recording/playback processing circuit 709 is modulated by the modulation device 708 by, e.g., RLL (Run Length Limited) modulation. The magnetic head 706 generates a magnetic field by the magnetic head driver 707 in accordance with the modulated signal. By the generated magnetic field, the image data is recorded on the recording section 107 as magnetic information.

Figure 15:
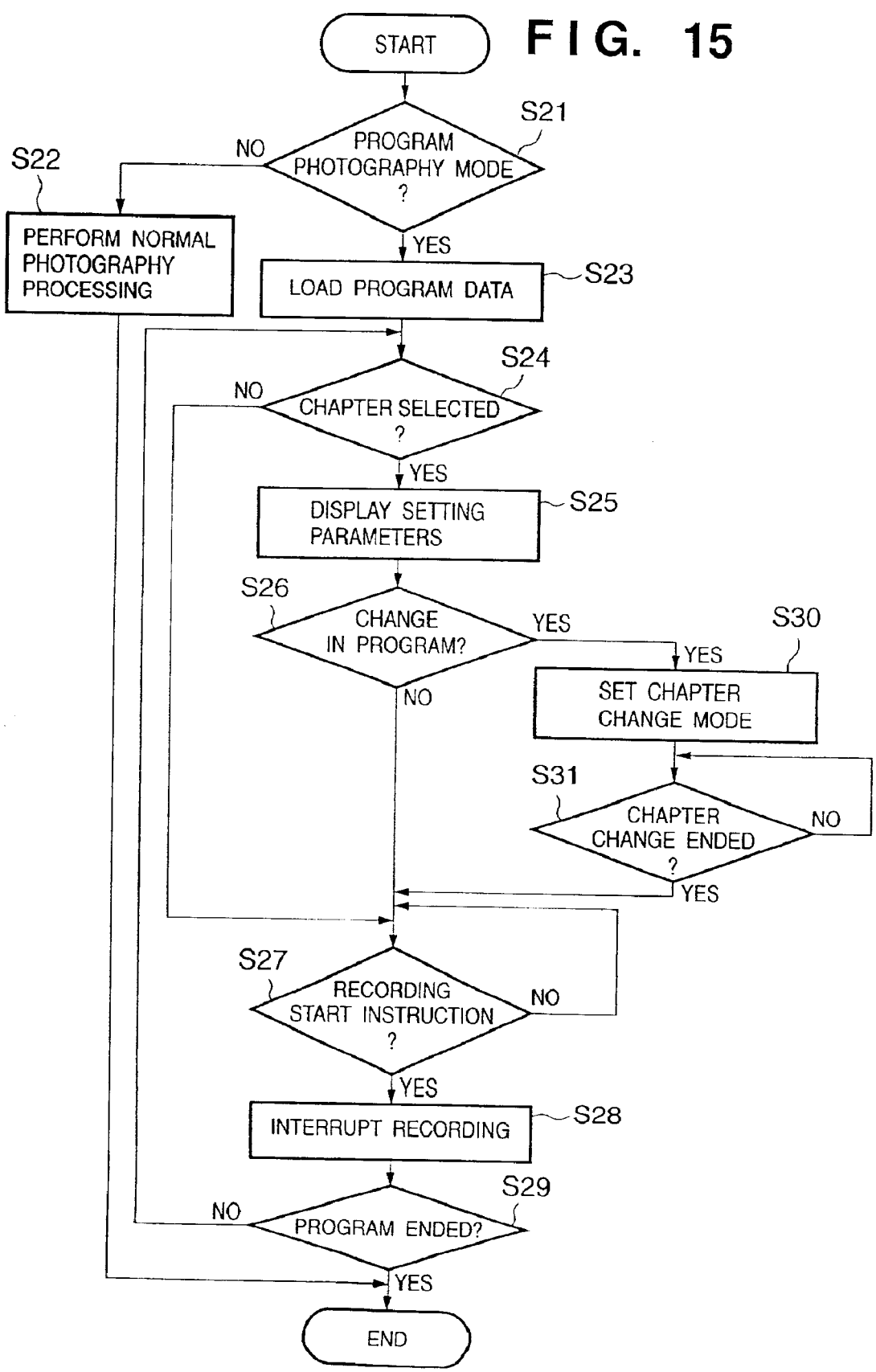
FIG. 15 is a flow chart for explaining processing of the photography program including chapter setting change processing.

Operation processing when the magnetooptical disk is used for the image pickup apparatus of this embodiment will be described with reference to the flow chart shown in FIG. 15. The photography program can be set as shown in FIG. 2 or 10, like the above-described embodiment. In this embodiment, a function is prepared to allow the user to manually change the order of programmed chapters or the parameter settings for each chapter when an unexpected situation occurs. Even while photography based on the photography program is being executed, the operation can appropriately shift to the mode for changing the order or parameters.

At the start of photography, it is determined whether photography processing based on a photography program set by the user in advance is instructed by a key operation section 113 (step S21). If NO in step S21, normal photography is executed (step S22).

If YES in step S21, the photography program set by the user in advance is read out from a memory (not shown) in a program setting section 112 and loaded to a RAM 111b (step S23). If only one photography program as shown in FIG. 2 or 10 is stored in the memory in the program setting section 112, the stored photography program is automatically loaded to the RAM 111b without being selected by the key operation section 113.

It is determined next whether a chapter number is selected by the key operation section 113 to change the chapter order of the photography program loaded to the RAM 111b (or skip a desired chapter) or check the contents of the photography program (step S24).

If YES in step S24, setting parameters such as a time 202, photography mode 203, frame display 204, and special effect 205 corresponding to the chapter number are displayed on a display section 106 (step S25). If no specific chapter number is designated by the user, setting parameters for the current chapter are displayed. If NO in step S24, the flow advances to step S27.

It is determined in step S24 whether setting change for the chapter number selected in step S24 is instructed (step S26). If YES in step S26, the flow advances to the chapter change mode in step S30. If NO in step S26, display of the setting parameters is ended, and the flow advances to step S27.

In step S30, when the processing advances to the chapter change mode, characters for changing the order (or stopping) the selected chapter number (if no chapter number is designated, the current chapter number) and the setting parameters are displayed on the display section 106. When the display section 106 is formed from a touch panel, the user touches characters corresponding to the chapter number and parameters to be changed, thereby changing the chapter or parameter settings for the next photography. When these changes are ended (step S31), the flow advances to step S27.

The start of recording is instructed by the key operation section 113, and photography operation corresponding to the chapter number under execution by program photography is performed (step S27). When a photography interrupt instruction is input in step S28, it is determined whether the end or interrupt of the photography program loaded to the RAM 111b is instructed (step S29). If YES in step S29, the photography processing based on the set photography program is ended. If NO in step S29, preparation for photography processing based on the setting parameters of the chapter set next is done.

As described above, in the form in which the magnetooptical disk 701 is used as a recording medium, even when an accident such as call off of an event takes place, the photography program can be changed in units of chapters. For example, the recording image quality and photography time can be scalably set by changing the compression ratio of the recording encoding scheme. In playing back an image, for the special effect between chapters, the image playback order can be arbitrarily changed by random access and high-speed read. When the special effect between the scenes after the change is also set in advance, the image can be played back without any sense of incompatibility.

Application Modification Example

The present invention is not limited to the above embodiments. For example, as the connection special effect, "defect" that forms an image with oil-painting touches, "pseudo color" that gives an image colors unrelated to the original image, "slit" that partially erases an image, "slice" that erases an image of a certain luminance level or more or less, "chromakeying" that erases an image with a specific hue, "level shift" that makes contrast in only a specific area of an image different from that in the remaining areas, "mosaic" that forms a mosaic image, or "scanimate" that deforms an image by rotation, movement, or enlargement/reduction can be used.

In the program photography mode, instead of starting photography of each chapter in response to the key operation, as in the above embodiments, photography of each chapter may be automatically performed after the start of he program photography mode. In this case, as the time, not the remaining time but the actual photography date/time (time zone) is set. At the time of non-photography between chapters, preferably, the processing automatically stands by in a power saving mode, and when the photography time for the next chapter comes, the power saving mode is automatically ended, and photography is started.

In addition, preferably, e.g., a setting change key is prepared and operated to change the settings of the photography program any time (including the time zone before photography of the first chapter immediately after the program photography mode starts and the photography interval period between the chapter photography operations).

As has been described above, according to this embodiment, photography in various photography modes can be easily executed.

In addition, unlike the prior art, an optimum photography mode need not be set by determining the situation of the photography scene for the first time at the site of photography, the user can devote himself/herself to determine the composition and properly perform photography in the desired composition, and various photography modes are not wasted because of the difficulty in photography mode switching operation.

As many apparently widely different embodiments of the present invention can be made without departing from the spirit and scope thereof, it is to be understood that the invention is not limited to the specific embodiments thereof except as defined in the appended claims.

What is claimed is:

1. An image pickup apparatus comprising:

setting means for setting a plurality of chapters; and control means for controlling photography operation in an order of the set chapters on the basis of settings of the plurality of chapters by said setting means, wherein said setting means sets, for each of the plurality of chapters, a photography time and a mode for executing desired photography during the photography time, and said control means automatically starts a photography operation of a next chapter after a photography time for a prior chapter is elapsed, and wherein when the photography time of a given chapter is prolonged, said control means corrects the photography times set by maid setting means for the chapters to be photographed after the given chapter, thereby controlling the photography operation.

2. The apparatus according to claim 1, wherein said control means shortens the photography times for the chapters to be photographed after the given chapter by a prolonged part of the photography time of the given chapter in proportion to the photography times set by said setting means.

3. The apparatus according to claim 1, further comprising: designating means for designating recording of a photographed image, wherein said control means starts the photography operation of a new chapter every time recording of the photographed image is designated by said designating means.

4. The apparatus according to claim 1, wherein said setting means sets a mode for performing desired exposure control for each chapter.

5. The apparatus according to claim 4, wherein said setting means sets the mode from a scenic mode, sports mode, and portrait mode.

6. The apparatus according to claim 1, wherein said setting means sets one of an interlaced photography mode and a non-interlaced photography mode.

7. The apparatus according to claim 1, wherein said setting means sets a special effect between the chapters.

8. An image pickup method comprising the steps of:

setting a photography time and a mode for executing desired photography during the photography time for each of a plurality of chapters; and controlling photography operation in an order of the set chapters on the basis of settings of the plurality of chapters, wherein in said controlling step, a photography operation of a next chapter i automatically started after a photography time for a prior chapter is elapsed, and wherein when the photography time of a given chapter is prolonged, the photography times preset for the chapters to be photographed up after the given chapter are corrected to control the photography operation.

9. The method according to claim 8, wherein the photography times for the chapters to be photographed after the given chapter are shortened by a prolonged part of the photography time of the given chapter in proportion to the preset photography times.

10. The method according to claim 8, wherein the photography operation of a new chapter is started every time recording of a photographed image is designated.

11. A computer readable program stored in memory medium for an operating processing program for an image pickup apparatus, comprising operation processing steps of:

setting a photography time and a mode for executing desired photography during the photography time for each of a plurality of chapters; and controlling photography operation in an order of the set chapters on the basis of settings of the plurality of chapters, wherein in said controlling step, a photography operation of a next chapter i automatically started after a photography time for a prior chapter is elapsed, and wherein when the photography time of a given chapter is prolonged, the photography times preset for the chapters to be photographed after the given chapter are corrected to control the photography operation.

12. The program according to claim 11, wherein the photography times for the chapters to be photographed after the given chapter are shortened by a prolonged part of the photography time of the given chapter in proportion to the preset photography times.

13. The program according to claim 13, wherein the photography operation of a new chapter is started every time recording of a photographed image is designated.

* * * * *

UNITED STATES PATENT AND TRADEMARK OFFICE
CERTIFICATE OF CORRECTION

| | |
|---|---|
| PATENT NO. | : 7,053,933 B2 |
| APPLICATION NO. | : 09/825022 |
| DATED | : May 30, 2006 |
| INVENTOR(S) | : Suzuki |

Page 1 of 1

It is certified that error appears in the above-identified patent and that said Letters Patent is hereby corrected as shown below:

In the Claim:

In claim 1 (col. 11, line 35), please replace "maid" with --said--.

In claim 8 (col. 12, line 15), please replace "i" with --is--.

In claim 11 (col. 12, line 40), please replace "i" with --is--.

In claim 13 (col. 12, line 52), please replace "13" with --11--.

Signed and Sealed this

Sixth Day of March, 2007

JON W. DUDAS
*Director of the United States Patent and Trademark Office*